United States Patent [19]

Kamerman et al.

[11] Patent Number: 5,369,639

[45] Date of Patent: *Nov. 29, 1994

[54] LOCAL AREA NETWORK HAVING A WIRELESS TRANSMISSION LINK

[75] Inventors: Adriaan Kamerman, Nieuwegein; Hendrik van Bokhorst, Nijkerk, both of Netherlands

[73] Assignee: NCR Corporation, Dayton, Ohio

[ * ] Notice: The portion of the term of this patent subsequent to Jul. 7, 2010 has been disclaimed.

[21] Appl. No.: 633,691

[22] Filed: Dec. 24, 1990

[30] Foreign Application Priority Data

Sep. 6, 1990 [GB] United Kingdom .............. 9019488.7

[51] Int. Cl.$^5$ ............................................. H04J 6/00
[52] U.S. Cl. ................... 370/85.3; 370/94.1; 340/825.5
[58] Field of Search ............... 370/85.1, 85.2, 85.3, 370/94.1, 95.1, 95.3; 340/825.5

[56] References Cited

U.S. PATENT DOCUMENTS

| | | | |
|---|---|---|---|
| 3,680,113 | 7/1972 | Dorier et al. | 343/100 SA |
| 4,070,637 | 1/1978 | Assal et al. | 333/7 R |
| 4,234,952 | 11/1980 | Gable et al. | 340/825.5 |
| 4,409,592 | 10/1983 | Hunt | 370/85.2 |
| 4,637,064 | 1/1987 | Roberts et al. | 455/67 |
| 4,667,191 | 5/1987 | Comroe et al. | 340/825.5 |
| 4,688,213 | 8/1987 | Raychaudhuri | 370/93 |
| 4,807,222 | 2/1989 | Amitay | 370/85 |
| 4,894,825 | 1/1990 | Kobayashi et al. | 370/124 |
| 4,979,168 | 12/1990 | Courtois et al. | 370/85.3 |
| 5,164,942 | 11/1992 | Kamerman et al. | 370/85.2 |
| 5,231,634 | 7/1993 | Giles et al. | 370/95.1 |

FOREIGN PATENT DOCUMENTS

| | | |
|---|---|---|
| 0064818 | 4/1982 | European Pat. Off. . |
| 0064347 | 11/1982 | European Pat. Off. . |
| 2012525 | 7/1979 | United Kingdom . |
| 2211053 | 6/1989 | United Kingdom . |
| 8911126 | 11/1989 | WIPO . |

OTHER PUBLICATIONS

D. Atallah, "Peer-to-peer protocol facilitates real-time communications", Aug. 18, 1988, pp. 179-186, EDN Electrical Design News, vol. 33, No. 17.

M. Serizawa, "A Radio Access Scheme for CSMA/CD LAN", Jun. 11, 1989, pp. 477-481, IEEE International Conference on Communications '89.

R. Beach et al., "System-level functions enhance controller IC", Oct. 6, 1992, pp. 95-97, Electronics, vol. 55, No. 20.

M. Leonard, "VLSI Ethernet Controller Targets Future LANs", Jan. 1990, pp. 110-112, Electronic Design, vol. 38, No. 2.

*Primary Examiner*—Stephen Chin
*Assistant Examiner*—T. Ghebretinsae
*Attorney, Agent, or Firm*—Elmer Wargo

[57] ABSTRACT

A local area network station (12) includes a transceiver (20) adapted to transmit and receive signals over a wireless communications link. The transceiver (20) is coupled to a CSMA/CD LAN controller device (22) and to a signal generator circuit (40) which is also coupled to the LAN controller device (22). If the station (12) desires to transmit a data frame but a carrier sense signal (CRS) indicates that the link is busy, transmission of the data frame is deferred, and after the carrier sense signal (CRS) becomes inactive, a collision is simulated by the signal generator circuit (40) providing a CDT signal to the LAN controller device (22) which goes into a backoff mode and attempts to retransmit the frame after a random backoff time. Thus, commercially available CSMA/CD chips can be utilized in a single wireless channel LAN environment using a CSMA/CA protocol, with a low risk of collisions.

11 Claims, 5 Drawing Sheets

LOCAL AREA NETWORK HAVING A WIRELESS TRANSMISSION LINK

BACKGROUND OF THE INVENTION

This invention relates to local area networks (LANs) wherein a plurality of stations communicate with one another over a transmission medium for the transmission of digital data.

Various methods are known for sharing network communication channels or links among stations in a local area network. One widely used method is known as CSMA/CD, (carrier sense multiple access with collision detection). According to this known method, a station wishing to transmit a message listens until the transmission channel is idle before commencing to transmit an information packet. Furthermore, the station continues to listen to the channel after commencing a transmission and if a collision is detected, that is, more than one station has commenced to transmit an information packet, any station which detects such collision terminates its message transmission and transmits a jam pattern (or garble) such that all other stations can be informed of the collision, terminate message transmission, and wait a random time before attempting to commence a further message transmission.

The CSMA/CD protocol is the subject of an international (ISO) standard and corresponding IEEE Standard, No. 802.3, and has become a generally used protocol for LANs utilizing wired connections for transmission between the stations. In consequence, CSMA/CD LAN controller chips have become widely commercially available. Several manufacturers produce such chips, complying with the IEEE 802.3 standard. An example is the Intel 82586 LAN coprocessor chip, available from Intel Corporation of Santa Clara, Calif., USA. Such chips provide various facilities useful in LANs, such as data rate range and backoff algorithm and configurable parameters such as slot time duration, retry counter offset and limit, and interframe spacing time.

However, LANs using wired interconnections have the disadvantage that extensive cabling is required to interconnect the stations. The provision of such cabling is generally inconvenient and gives rise to inflexibility if it is desired to alter the physical locations of the stations. It has been proposed to utilize a wireless transmission link operating at radio frequencies to replace the cabling interconnections of a LAN. However, if only a single radio channel is to be utilized for such a LAN, the widely accepted CSMA/CD protocol cannot generally be applied since a station cannot generally receive (or listen) while it is transmitting.

European Patent Application No. 0 064 818 discloses a wired LAN which utilizes a data collision avoidance method. Each station with a data packet ready for transmission monitors the activity of the communications channel. If activity on the channel is detected, the station waits until the channel is idle and then introduces a random wait, at the end of which the transmission is effected if the channel is still idle.

SUMMARY OF THE INVENTION

It is an object of the present invention to provide a LAN station suitable for use with a single channel wireless transmission link, which is of simple and inexpensive construction, while providing a low risk of collisions on the transmission link.

Therefore, according to the present invention, there is provided a local area network station comprising:
memory means for storing data to be transmitted;
communication controller means to control the transmission of data frames by said station;
transceiver means to operate on a single wireless transmission channel; and
signal generating means coupled to said communication controller means and said transceiver means;
said communication controller means being effective:
   a. to defer transmission of a said data frame in response to a first control signal applied thereto;
   b. to terminate transmission of a said data frame being transmitted and to reinstate transmission thereof as a deferred data frame after a backoff period in response to a second control signal (CDT) applied thereto; and
   c. to output a third control signal (RTSA) requesting transmission of a deferred data frame;
      said generating means being effective to generate said second control signal to cause said communication controller means to inhibit transmission of said deferred data frame until said backoff period has elapsed.

This invention also relates to a method of communicating among at least two data processing stations coupled by a radio LAN comprising, the steps of:
   (a) monitoring the radio LAN to detect the end of a data transfer thereover;
   (b) generating a Window signal dependent upon said end of said data transfer;
   (c) generating Request to Send signal during a Window signal by a station wishing to transmit to thereby generate a collision detect signal (CDT)
   (d) using the CDT signal to initiate random delay times assigned to the data processing stations; and
   (e) initiating transmission by the data processing station generating said CDT signal at the end of the delay time assigned thereto.

It will be appreciated that a local area network station according to this invention has a simple construction and is suitable for a single channel wireless transmission link, resulting from the ability to use commercially available CSMA/CD controller chips as communication controller means and the utilization of such chips in a CSMA protocol with collision avoidance (CSMA/CA) rather than collision detection (CSMA/CD).

The above advantages and others will be more readily understood in connection with the following description, claims and drawing.

DESCRIPTION OF THE PREFERRED EMBODIMENT

Figure 1:
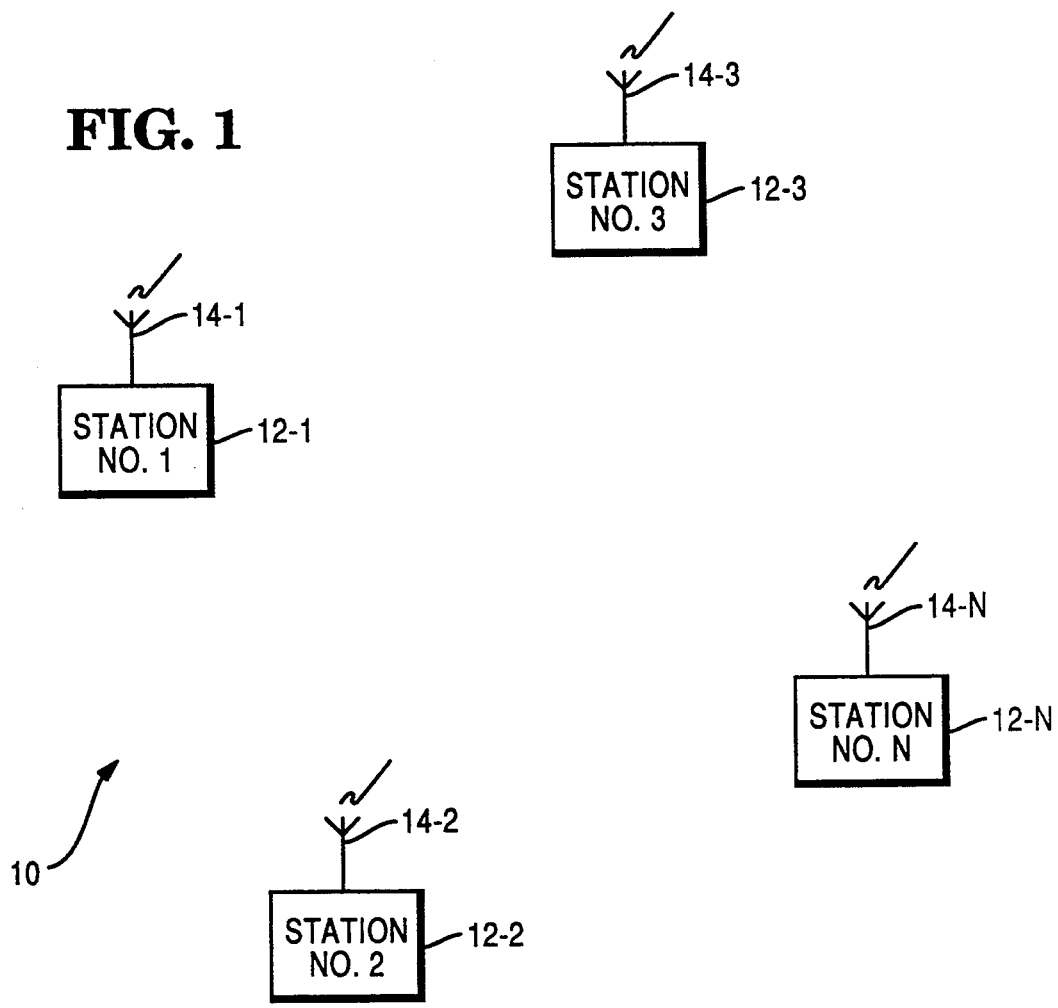
FIG. 1 is a diagram of a radio LAN.

Referring first to FIG. 1, there is shown a radio local area network (radio LAN) 10 including a plurality N of stations 12, shown individually as 12-1 to 12-N. Each station has an antenna 14, shown individually as 14-1 to 14-N. Although only a single antenna is shown for each station, it will be understood that each station may have two antennas to provide a diversity feature for alleviating multipath fading which may arise in some environments.

Communication among the stations 12 takes place over a radio link, on a single radio channel, and preferably uses spread spectrum communication technology.

Figure 2:
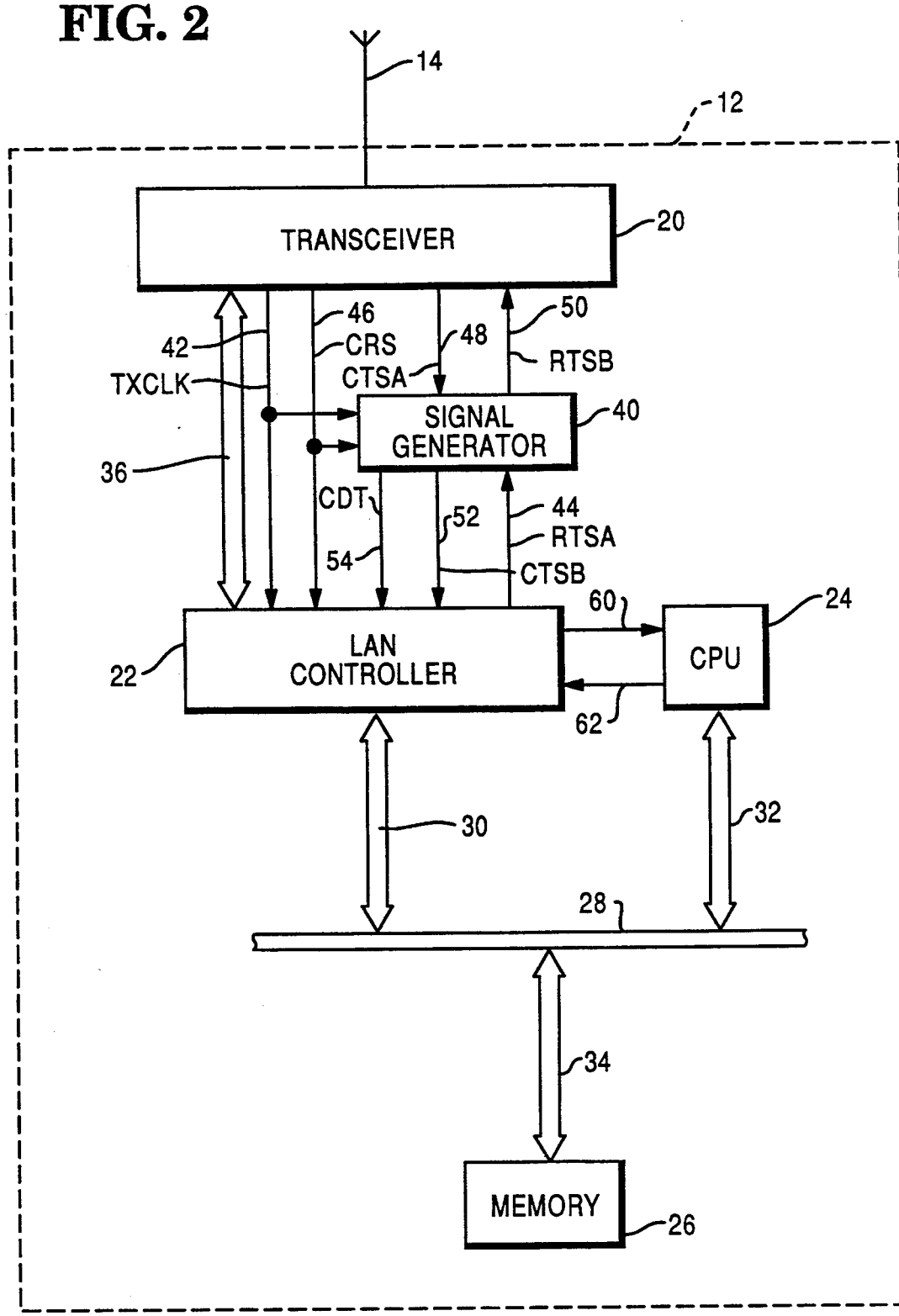
FIG. 2 is block diagram of a typical station utilized in the LAN shown in FIG. 1.

Referring now to FIG. 2, there is shown a block diagram of the components of a typical station 12, illustrating the blocks thereof which are pertinent to the present invention. The station 12 includes a transceiver 20, a LAN controller 22, a central processor unit (CPU) 24, and a memory 26. A local bus 28 is connected to the LAN controller 22 by a bus 30, to the CPU 24 by a bus 32, and to the memory 26 by a bus 34. The LAN controller 22 is a commercially available LAN controller device, suitable for the CSMA/CD (carrier sense multiple access with collision detection) protocol. In the preferred embodiment, the LAN controller 22 is an Intel 82586 LAN coprocessor chip, available from Intel Corporation of Santa Clara, Calif., U.S.A.

The transceiver 20 and LAN controller 22 are interconnected by a bus 36 which carries data and control signals. Also included in the station 12 is a signal generator circuit 40 which is interposed between the transceiver 20 and the LAN controller 22. The signal generator circuit 40 receives transmit clock pulses TXCLK from the transceiver 20 over line 42 and a request-to-send signal RTSA from the LAN controller 22 over a line 44.

The signal generator circuit 40 also receives a carrier sense signal CRS and a clear-to-send signal CTSA from the transceiver 20 over lines 46, 48 respectively. The TXCLK pulses on the line 42 and the CRS signal on the line 46 are also applied directly to the LAN controller 22.

The signal generator circuit 40 provides an output request-to-send signal RTSB over a line 50 connected to the transceiver 20, an output clear-to-send signal CTSB over a line 52 connected to the LAN controller 22, and an output simulated collision detect signal CDT over a line 54 also connected to the LAN controller 22. The functions of the various signals applied to, and provided by, the signal generator circuit 40 will be explained in detail hereinafter.

The LAN controller 22 is connected to the CPU 24 over signal lines 60 and 62, whereby control signals (such as interrupts) may be passed between the CPU 24 and the LAN controller 22.

It should be understood that the LAN controller 22 operates according to the CSMA/CD protocol, as set forth for example in the aforementioned IEEE 802.3 standard. As previously mentioned, the LAN controller 22 is a commercially available LAN controller device. The operation of such a controller in accordance with usage in a CSMA/CD system will now be briefly described by way of background information which is helpful as an aid to understanding the present invention. Thus, where used in a wired LAN utilizing the CSMA/CD protocol, the controller constantly monitors link activity. Whenever it senses a carrier signal on the link, the controller defers passing a data frame by deferring any pending transmission. After the carrier signal goes inactive, the controller continues to defer for an interframe spacing time configurable to a certain number of clock cycles. If, at the end of that time, it has a frame waiting to be transmitted, transmission is initiated independently of the sensed carrier. After transmission has been started, the controller attempts to transmit the entire frame. In the normal case, frame transmission is completed, and the host processor is notified. However, transmission may be terminated prematurely. This occurs, for example, when the collision detect input to the controller is activated, as will now be described. When the controller has finished deferring and has started transmission, it is still possible to experience link contention. This situation is called a collision, and it is generally detected by the transceiver, which then activates the collision detect input to the controller. The controller informs the other stations of a collision by transmitting a jam pattern, which is detected by the other stations in the LAN. The dynamics of collision handling are largely determined by a so-called "slot time". The slot time is configurable and normally based on the maximum end to end round trip delay time of the network plus jam time. Slot time is important because it is the worst case time to detect a collision. After a collision, the controller attempts to retransmit the frame after a so-called backoff time, unless the number of retransmission attempts has exceeded the maximum allowed. The controller calculates the backoff time according to the IEEE 802.3 standard: backoff is an integral number of slot times. It is a random number, from 0 to a maximum value. The maximum value is $2^R-1$), where R is the minimum between 10 and the number of retransmission attempts. This range can be extended using an "accelerated contention resolution" mechanism. The application of this capability gives a range from 0 to a maximum value of $2^{R+K}-1$, where K is the retry counter offset and R+K has a maximum value of 10. It should be understood that the controller includes a retry counter which is incremented after each retransmission attempt. If retransmission is successful, the user is notified. If the number of retries exceeds the maximum, an error is reported.

Returning to the single-channel radio LAN 10, FIG. 1, difficulties arise in an attempt to apply a CSMA/CD protocol since a station 12 which is transmitting cannot receive a signal, thereby rendering the detection of a collision difficult or impossible. However, it would be feasible to apply a CSMA technique without collision detection if the risk of collisions were small. This requires that any carrier activity has to be detected very quickly to minimize the probability that different stations start transmitting simultaneously or at times very closely spaced. The carrier detect time can be regarded as a period during which collisions can occur, and it should be small compared to the message duration. In a radio LAN, the carrier detect time has several contributions, namely transceiver delay (transmitter and receiver) and through-the-air delay. The main part of the carrier detect time (of about 30 microseconds) is contributed by the receiver, resulting from functions such as automatic gain control, correlator filter, and carrier-signal detection. The through-the-air delay at indoor distances below 300 meters is small (less than 1 microsecond). This carrier detect time is relatively long compared with a typical carrier detect of about 1 to 6 microseconds for a wired LAN. Thus, the application of a straightforward CSMA technique for a radio LAN has disadvantages.

Referring again to FIG. 2, the signal generator circuit 40 is effective to simulate a collision, thereby providing a CDT (collision detect) signal on the line 54 when a data frame transmission has been deferred, even though no actual collision has occurred. Thus, transmission of the deferred data frame is initiated only after the lapse of a random backoff time. In this manner, the risk of collisions resulting from stations 12 commencing to transmit at simultaneous or closely spaced times is considerably reduced.

Figure 3A:
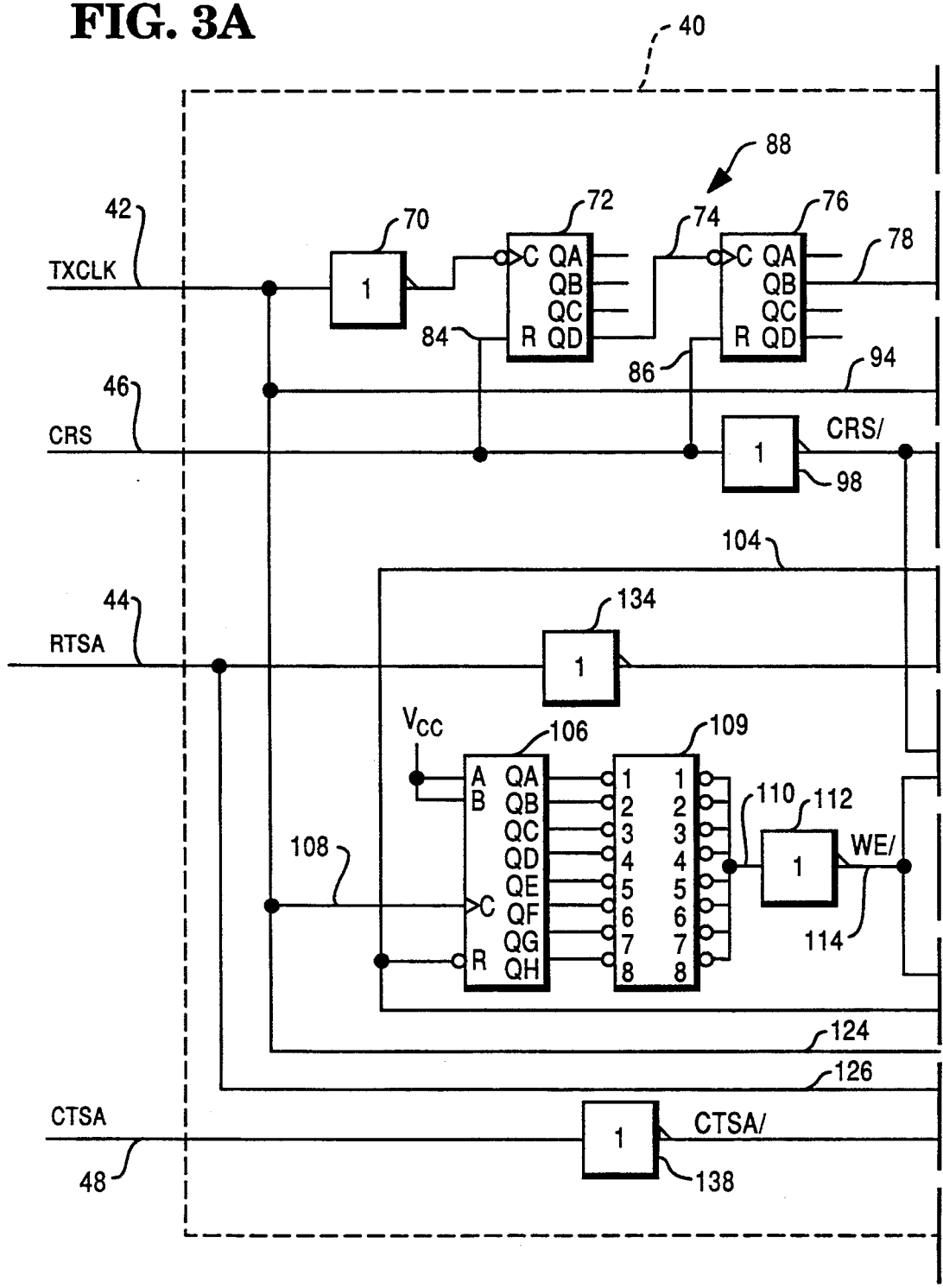
FIG. 3A and 3B taken together show a signal generating means used with this invention.
Figure 3B:
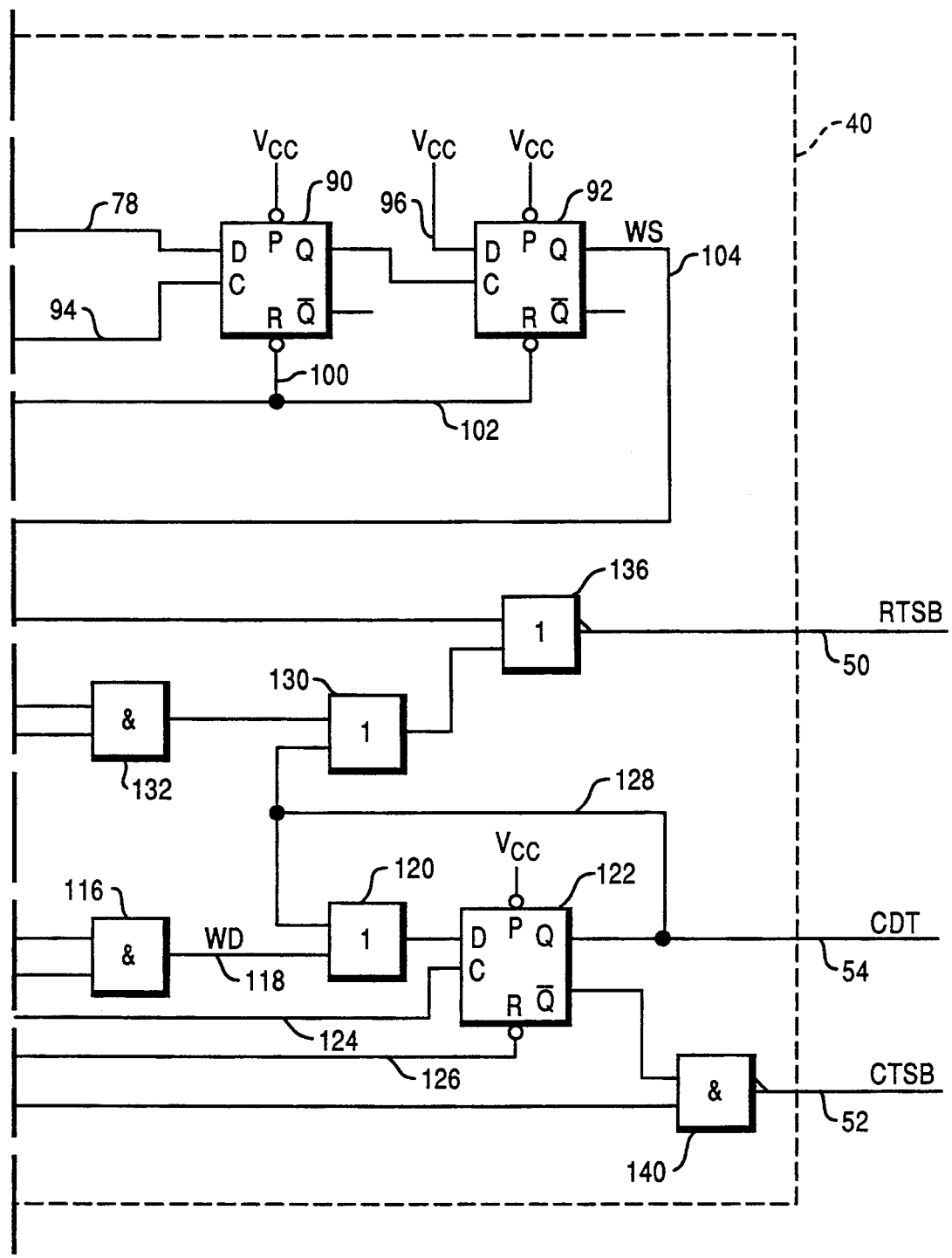

With the above in mind, the signal generator circuit 40 will now be described with reference to FIGS. 3A and 3B. The input line 42, which carries the TXCLK pulses is connected to an inverter 70, the output of which is connected to the count input of 4-bit counter 72 having its QD output connected over a line 74 to a 4-bit counter 76, the QB output of which is connected over a line 78 to the D input of a D-type flip-flop 90. The input line 46, which provides the carrier sense signal CRS, is connected over lines 84 and 86 to reset inputs of the counters 72 and 76, respectively. It should be understood that the devices 70, 72, and 76 together form a timer, indicated generally as 88, such that an active signal appears at the QB output of the counter 76 after a time corresponding to 32 TXCLK periods from the falling edge of the CRS signal.

The Q output of the flip-flop 90 is connected to the clock input of a D-type flip-flop 92. The clock input of the flip-flop 90 is connected over a line 94 to the input line 42. The D input of the flip-flop 92 is connected to a supply voltage $V_{cc}$. The input line 46 is connected to an inverter 98, the output of which is connected to the reset inputs of the flip-flops 90 and 92, over lines 100 and 102, respectively. With this arrangement, the Q output of the flip-flop 92 provides a window start signal WS on an output line 104.

The line 104 is connected to the reset input of an 8-bit shift register 106 (FIG. 3A), the clock input of which receives the TXCLK pulses over a line 108 connected to the input line 42. The outputs of the shift register 106 are connected to respective inputs of a header 109, having its outputs commonly connected to a line 110, whereby a desired one of the shift register outputs may be selected to apply a corresponding delayed signal to the output line 110. The line 110 is connected to an inverter 112 whose output on the line 114 provides an active low window end signal WE/. The WS and WE/-signals on the lines 104 and 114 are applied to an AND gate 116 (FIG. 3B), the output of which provides a window signal WD on a line 118.

The window signal WD on the line 118 is applied to an OR gate 120, the output of which is connected to the D input of a D-type flip-flop 122, the Q output of which is connected to the output line 54 to provide the simulated collision detect signal CDT. The clock input of the flip-flop 122 is connected over a line 124 to receive the TXCLK pulses from the input line 42. The reset input of the flip-flop 122 is connected over a line 126 to the input line 44 which carries the request-to-send signal RTSA.

The Q output of the flip-flop 122 (FIG. 3B) is also connected via a line 128 to an input of the OR gate 120 and to an input of an OR gate 130. Another input of the OR gate 130 is connected to the output of an AND gate 132 which has inputs connected, respectively, to the output of the inverter 98 and to the output of the inverter 112.

The input line 44 (FIG. 3A) is also connected to an inverter 134, the output of which is connected to an input of a NOR gate 136 (FIG. 3B), a second input of which is connected to the output of the OR gate 130.

The output of the NOR gate 136 is connected to the output line 50 to provide the request-to-send signal RTSB.

The input line 48 is connected to an inverter 138 (FIG. 3A) the output of which is connected to an input of a NAND gate 140 (FIG. 3B) a second input of which is coupled to the Q/output of the flip-flop 122. The output of the NAND gate 140 is connected to the output line 52 to provide the clear-to-send signal CTSB.

The operation of the signal generator circuit 40 (FIGS. 3A and 3B) will now be briefly described. When the carrier sense signal CRS on the line 46 drops, the timer 88 provides an active output signal on the line 78 after 32 TXCLK pulse periods, corresponding to the interframe spacing (IFS) time. The output of the timer 88 is synchronized by the flip-flop 90 to eliminate any possible voltage spikes. The CRS/signal at the output of the inverter 98 ensures that the flip-flops 90 and 92 are enabled when the signal CRS drops. The output of the flip-flop 92 provides the window start signal WS at a time 32 TXCLK pulse periods after the CRS signal drops. When the window start signal WS on the line 104 is inactive, it resets the shift register 106. When the window start signal WS becomes active, it is delayed and inverted by the shift register 106, header 109, and inverter 112, to provide an inverted window end signal WE/on the line 114. The WS signal on the line 104 and the WE/signal on the line 114 are combined in the AND gate 116 to provide the window signal WD which is active for a predetermined number N of TXCLK pulse periods, where N lies between 1 and 8, and is selected by selecting a desired one of the outputs QA to QH of the shift register 106 by connecting the corresponding equal numbered pins on the header 109. In the preferred embodiment, the output QD of the shift register 106 is selected, whereby, when the window signal WD has become active, it stays active for 4 TXCLK periods.

If the signal RTSA on the line 44 becomes active during the active state of the window signal WD, the flip-flop 122 provides the signal CDT on The line 54, simulating a collision. The feedback from the flip-flop 122 on the line 128 to the OR gate 120 ensures that when the signal CDT becomes active, it stays active until the falling edge of the signal RTSA (after the controller 22 has transmitted the preamble and jam pattern).

The inverter 138 and NAND gate 140 ensure that the signal CTSB follows the signal CTSA as long as the signal CDT is not active (no simulated collision). When CDT becomes active, then the signal CTSB also becomes active independently of the signal CTSA.

The signal RTSB is produced by utilizing the inverter 134, the AND gate 132, the OR gate 130 and the NOR gate 136. Thus, the signal RTSB does not follow the signal RTSA if the signal CDT is active (simulated collision), thereby preventing transmission of the preamble and jam pattern. Also, since the signal CTSA/-from the inverter 138 is applied to the NAND gate 140 together with the output of the flip-flop 122, the signal CTSB follows the signal CTSA as long as CDT is inactive.

The operation of the station 12 will now be explained, with reference to FIGS. 4A to 4C, under three operating conditions. Referring first to FIG. 4A, the waveforms shown therein relate to the situation where another station transmits a data frame, but the station 12 (FIG. 2) does not request transmission of a data frame.

Under these conditions, the window signal WD is generated after the 32-bit IFS (interframe spacing) time, but since the station 12 is not requesting to transmit a data frame, the window signal WD has no significant effect.

Figure 4C:
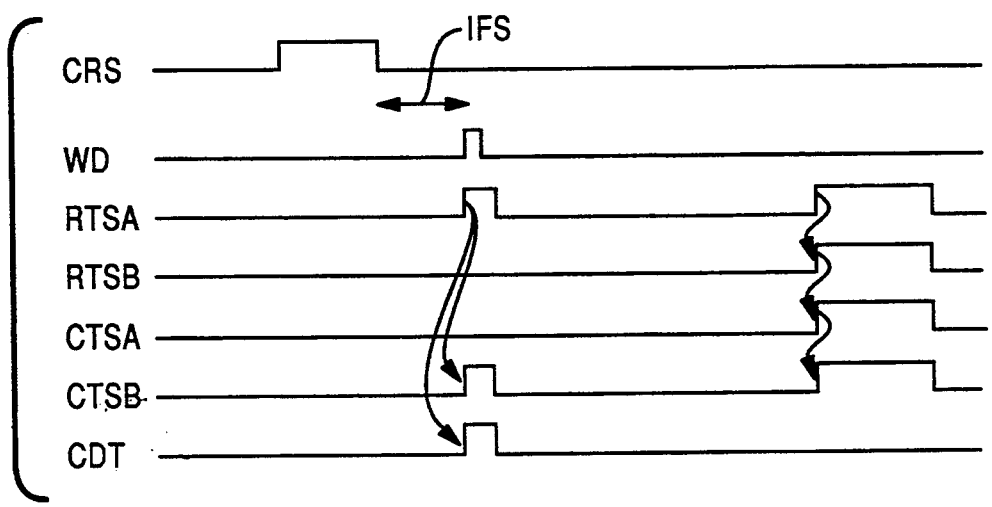
FIGS. 4A, 4B and 4C are waveform diagrams helpful in understanding the operation of the LAN station shown in FIG. 2, with FIG. 4C being shown on the sheet containing FIG. 1.
Figure 4A:
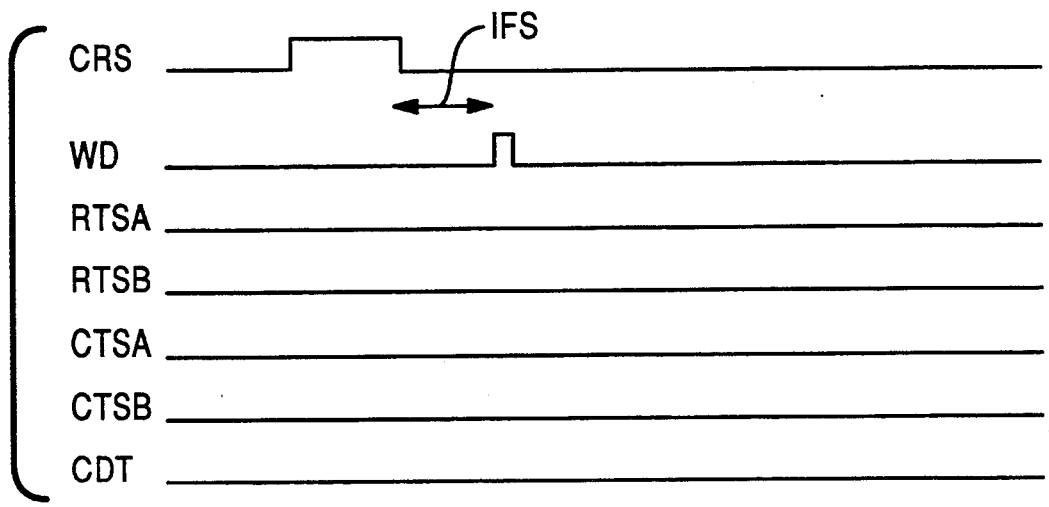
Figure 4B:
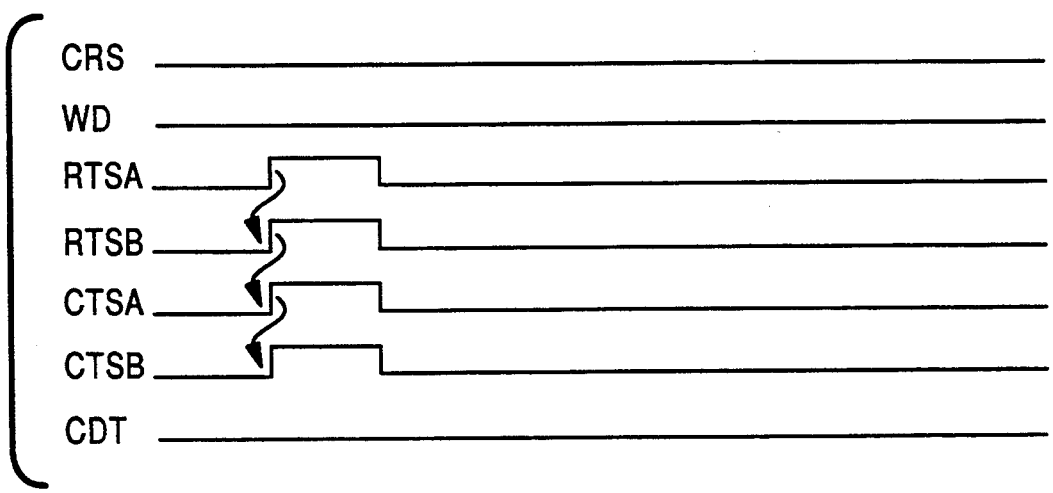

Referring now to FIG. 4B, the waveforms shown therein relate to the situation where the station 12 requests transmission of a data frame, but the other stations are inactive, so that the CRS signal remains at a low level. Under these conditions, the window signal WD is not generated. The request-to-send signal RTSA causes the signal generator circuit 40 to provide the request-to-send signal RTSB to the transceiver 20, which in response provides a clear-to-send signal CTSA to the signal generator circuit 40 which provides the clear-to-send signal CTSB to the LAN controller 22, whereby data frame transmission is enabled.

Referring finally to FIG. 4C, the waveforms shown therein relate to the situation where another station is transmitting a data frame, such that the signal CRS in the station 12 is active at a time when, in the station 12, the LAN controller 22 is notified that the station 12 desires to transmit a data frame. Under these conditions, transmission of the data frame in the station 12 is deferred by the controller 22. After the signal CRS becomes inactive, and following the elapse of the interframe spacing time IFS, the window signal WD is generated in the signal generator circuit 40 in the manner described hereinabove with reference to FIGS. 3A and 3B. Since the controller 22 also activates the signal RTSA at this time, the signal generator circuit 40 activates the signal CDT on the line 54, to simulate a collision. This causes the controller 22 to stop its transmission after completion of sending the preamble and jam patterns. However, these patterns are not transmitted by the station 12 since the signal RTSB is not generated if a collision is simulated. Thus, the controller 22 is conditioned to the backoff mode, calculates its backoff time based on a random number of slot times, as discussed hereinabove, where the random number lies between 0 and $2^{R+K}-1$, K being the preset retry counter offset value. After the random backoff period has expired, the controller 22 attempts to retransmit the deferred frame, as shown at the right-hand side of FIG. 4C.

It will be appreciated that, in accordance with the collision avoidance technique described herein, there is generated, after deferring a frame to be transmitted, a random waiting time before the first new transmission attempt. The total waiting time after the carrier goes inactive is composed of the interframe spacing time, the preamble and jam pattern, a second interframe spacing time, and a random number of slot time intervals between 0 and $2^{K+1}-1$. For an exemplary collision avoidance (CA) operation, the retry counter offset value K can be set to the value 5, making collisions very unlikely. At this retry counter offset value, the probability that two controllers 22 of different stations 12, after deferring frames that arrived during the same period of carrier activity, take the same random number is 1/64.

For the described radio LAN, there are available the following configurable parameters of the controller 22 different from the default settings: slot time, interframe spacing time, and retry counter offset. These configurable parameters have default settings corresponding the IEEE 802.3 Standard with settings for a 10 Mbps network (slot time of 512 bit-times appropriate in a wired environment with maximum delay; interframe spacing time of 96-bit-times; retry counter offset of 0). For a radio LAN operating at 2 Mbps and an end-to-end (carrier detect time) delay of 30 microseconds, shorter slot and interframe spacing times can be utilized. In the preferred embodiment, the slot time is fixed at 80 bit-times, the interframe spacing time is 32 bit-times, and the retry counter offset is 5. These settings will result after deferring in a perceptible interframe spacing time of 56 microseconds (corresponding to the duration of two interframe spacing times, the preamble pattern, and the jam pattern of the controller 22), followed by a random waiting time of between 0 and 2.52 milliseconds.

The popularity of the CSMA/CD protocol for wired LANs has resulted in the widespread availability and low cost of VLSI circuits such as CSMA/CD LAN controller chips. The CSMA/CD protocol requires the ability of a transmitting station to detect the occurrence of a transmission from another station, to be aware of the occurrence of a collision. In a radio environment, however, the difference between transmit and receive levels is too great and therefore collisions cannot be detected. Application of the CSMA/CD protocol would therefore not be possible without the loss of frames due to: (1) stations accidentally starting to transmit within the carrier detect time from each other; and (2) stations starting to transmit just after the end of another station's transmission. The present invention enables the application of CSMA/CD LAN controller chips in a radio LAN environment by providing the signal generator circuit 40 disposed between the LAN controller chip 22 and the radio transceiver 20, thereby obviating the loss of frames in situation (2) above.

Although the preferred embodiment has been described as a wireless LAN using radio frequency transmissions, it will be appreciated that in alternative embodiments, other frequencies, outside the 10 KHz to 3000 GHz radio frequency band, such as infrared frequencies, may be employed in the wireless LAN.

To summarize this invention in claim-like language, it relates to a local area network station comprising:

memory means (26) for storing data to be transmitted;

communication controller means (22) to control the transmission of data frames by said station;

transceiver means (20) to operate on a single wireless transmission channel; and signal generating means coupled to said communication controller means and said transceiver means;

said communication controller means being effective:

a. to defer transmission of a said data frame in response to a first control signal (CRS) applied thereto;

b. to terminate transmission of a said data frame being transmitted and to reinstate transmission thereof as a deferred data frame after a backoff period in response to a second control signal (CDT) applied thereto; and c. to output a third control signal (RTSA) requesting transmission of a deferred data frame; and said generating means being effective to generate said second control signal to cause said communication controller means to inhibit transmission of said deferred data frame until said backoff period has elapsed.

The signal generating means (40) includes:

window signal generating means (88, 90, 92, 98, 106, 109, 112, and 116) to generate a window signal (WD) in response to termination of said first control signal (CRS); and first logic circuit means (120 and 122) responsive to said window signal (WD) and to said third control signal (RTSA) to generate said second control signal (CDT).

The signal generating means also includes:

timer means (88) for generating an output;

second logic circuit means (90 and 92) having said output from said timer means coupled thereto to generate a window start signal (WS) a first predetermined time after termination of said first control signal (CRS);

third logic circuit means (106, 109, and 112) to generate a window end signal (WE/) a second predetermined time after initiation of said window start signal (WS); and fourth logic circuit means responsive to said window start signal (WS) and said window end signal (WE/) to generate said window signal (WD).

The third logic means (106, 109, and 112) includes:

a shift register having an input to receive said window start signal (WS) from said second logic circuit means, with said shift register also having a plurality of outputs (106);

a header device (109) having a plurality of inputs and a plurality of outputs, with said plurality of inputs of said header device being coupled, correspondingly, to said plurality of outputs of said shift register; and a common line (110) having said plurality of outputs of said header device coupled thereto to provide a time for which said window signal (WD) is active by a selective connection between a selected input of said plurality of inputs of said header device and a selective output of said plurality of outputs of said header device.

The signal generating means (40) also includes:

fifth logic circuit means (130 and 136) responsive to said second control signal (CDT) and said third control signal (RTSA) to generate a fourth control signal (RTSB) applied to said transceiver means (20); said fourth control signal (RTSB) being indicative of a request-to-send condition and said fourth control signal being inhibited by said fifth logic means if said second control signal (CDT) is active.

The transceiver means (20) has means to generate a fifth control signal (CTSA) indicative of a clear-to-send condition in said transceiver means; and said signal generating means (40) includes:

sixth logic circuit means (138 and 140) responsive to said second control signal (CDT) to provide a sixth control signal (CTSB) to said communication controller means (22) when said fifth control signal (CTSA) is active or when said second control signal (CDT) is active.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A local area network station comprising:

memory means for storing data to be transmitted;

communication controller means to control the transmission of data frames by said station;

said communication controller means including a CSMA/CD local area network (LAN) controller chip which is usually used in wired LANs to operate with collision detection;

transceiver means to operate on a single wireless transmission channel; and signal generating means coupled to said communication controller means and said transceiver means;

said communication controller means being effective:

a. to defer transmission of a said data frame in response to a first control signal applied thereto, indicating that said transmission channel is active;

b. to terminate transmission of a said data frame being transmitted when said transmission channel is active, and to reinstate transmission thereof as a deferred data frame after a backoff period in response to a second control signal applied thereto; and c. to output a third control signal requesting transmission of a deferred data frame;

said signal generating means being effective to generate said second control signal to cause said communication controller means to inhibit transmission of said deferred frame until said backoff period has elapsed; and said second control signal being a simulated collision detect signal to initiate said backoff period to enable said controller chip to operate substantially with collision avoidance.

2. The local area network station as claimed in claim 1 in which said signal generating means includes:

window signal generating means to generate a window signal in response to termination of said first control signal; and first logic circuit means responsive to said window signal and to said third control signal to generate said second control signal.

3. The local area network station as claimed in claim 2 in which said signal generating means also includes:

timer means for generating an output;

second logic circuit means having said output from said timer means coupled thereto to generate a window start signal a first predetermined time after termination of said first control signal;

third logic circuit means to generate a window end signal a second predetermined time after initiation of said window start signal; and fourth logic circuit means responsive to said window start signal and said window end signal to generate said window signal.

4. The local area network station as claimed in claim 3 in which said third logic means includes:

a shift register having an input to receive said window start signal from said second logic circuit means, with said shift register also having a plurality of outputs;

a header device having a plurality of inputs and a plurality of outputs, with said plurality of inputs of said header device being coupled, correspondingly, to said plurality of outputs of said shift register; and a common line having said plurality of outputs of said header device coupled thereto to provide a time for which said window signal (WD) is active by a selective connection between a selected input of said plurality of inputs of said header device and a selective output of said plurality of outputs of said header device.

5. The local area network station as claimed in claim 4 in which said signal generating means includes:

fifth logic circuit means responsive to said second control signal and said third control signal to generate a fourth control signal applied to said transceiver means; said fourth control signal being indicative of a request-to-send condition and said fourth control signal being inhibited by said fifth logic means if said second control signal is active.

6. The local area network as claimed in claim 5 in which said transceiver means has means to generate a fifth control signal indicative of a clear-to-send condition in said transceiver means; and in which said signal generating means includes:

sixth logic circuit means responsive to said second control signal to provide a sixth control signal to said communication controller means when said fifth control signal is active or when said second control signal is active.

7. A method of communicating over a single wireless transmission channel among at least two data processing stations coupled by a radio local area network LAN comprising the steps of:

(a) monitoring the radio LAN to detect the end of a data transfer thereover;

(b) generating a Window signal dependent upon the end of said data transfer;

(c) generating a Request to Send signal during a Window signal by a station wishing to transmit to thereby generate a simulated collision detect signal (CDT);

(d) using the CDT signal in association with a CSMA/CD LAN controller chip which is used for collision detection in wired LANs to initiate random delay times assigned to the data processing stations; and (e) initiating transmission by the data processing station generating said CDT signal at the end of the delay time assigned thereto;

said simulated collision detect signal being used to initiate said random delay times to enable said controller chip to operate substantially with collision avoidance.

8. The method as claimed in claim 7 in which said using and initiating steps are effected by using a CSMA/CD LAN controller chip complying with an IEEE 802.3 standard.

9. A method of communicating over a single wireless transmission channel among at least two data processing stations coupled by a radio LAN while using a CSMA/CD LAN controller chip which is designed for use with collision detection in a wired LAN; said method comprising the steps of:

(a) generating a control signal which is a simulated collision detect signal at a predetermined time by a data processing station wishing to transmit;

(b) using the control signal to activate a collision detect input of said controller chip; and (c) using a random delay time issued by said controller chip to initiate transmission by said data processing station from step (a) after the expiration of the associated delay time to enable said controller chip to operate substantially with collision avoidance.

10. A system for communicating over a single wireless transmission channel among at least two data processing stations coupled by a radio LAN comprising:

means for monitoring the radio LAN to detect the end of a data transfer thereover;

means for generating a Window signal dependent upon the end of said data transfer;

means for generating a Request to Send signal during said Window signal by a data processing station wishing to transmit to thereby generate a simulated collision detect signal (CDT);

means including a CSMA/CD signal and for initiating random delay times assigned to the data processing stations in the system; and means for initiating transmission by the data processing station generating said CDT signal at the end of the random delay time assigned thereto to operate substantially with collision avoidance.

11. A method of communicating over a single wireless transmission channel among at least two data processing stations coupled by a radio LAN, in which each said data processing station generates a Request to Send signal when that station wishes to transmit data; the method comprising the steps of:

(a) processing the Request to Send signal to generate a simulated collision detect signal (CDT) by the station wishing to transmit data;

(b) using the CDT signal to activate a collision detect input of a CSMA/CD controller chip which is used in the wired LANs; and (c) using a random delay time issued by the controller chip to initiate transmission by said data processing station from step (a) after the expiration of the associated random delay time to operate substantially with collision avoidance.

* * * * *